(12) United States Patent
Shekhter et al.

(10) Patent No.: US 12,012,697 B2
(45) Date of Patent: Jun. 18, 2024

(54) THROUGH-AIR APPARATUS TO REDUCE INFILTRATION OF AMBIENT AIR

(71) Applicant: Valmet AB, Sundsvall (SE)

(72) Inventors: Mikhail Y. Shekhter, South Portland, ME (US); Robert H. Miller, III, Gray, ME (US)

(73) Assignee: Valmet AB, Sundsvall (SE)

( * ) Notice: Subject to any disclaimer, the term of this patent is extended or adjusted under 35 U.S.C. 154(b) by 469 days.

(21) Appl. No.: 17/335,365

(22) Filed: Jun. 1, 2021

(65) Prior Publication Data
US 2022/0380979 A1 Dec. 1, 2022

(51) Int. Cl.
| | |
|---|---|
| *B32B 41/00* | (2006.01) |
| *B32B 5/26* | (2006.01) |
| *B32B 37/00* | (2006.01) |
| *D21F 5/18* | (2006.01) |
| *D21F 11/04* | (2006.01) |
| *D21H 27/00* | (2006.01) |

(Continued)

(52) U.S. Cl.
CPC .............. *D21F 5/182* (2013.01); *B32B 5/266* (2021.05); *B32B 37/0046* (2013.01); *D21F 11/04* (2013.01); *D21H 27/002* (2013.01); *F16L 3/02* (2013.01); *F16L 5/02* (2013.01); *F16L 11/125* (2013.01); *F16L 45/00* (2013.01); *F16L 57/00* (2013.01); *F16L 59/143* (2013.01)

(58) Field of Classification Search
CPC ......... D21F 5/182; D21F 11/04; B32B 5/266; B32B 37/0046; D21H 27/002; F16L 3/02; F16L 5/02; F16L 11/125; F16L 45/00; F16L 57/00; F16L 59/143; F26B 3/06; F26B 13/16; F26B 21/04; F26B 23/022; F26B 25/008

USPC .................... 156/60, 64, 350, 351, 378, 379
See application file for complete search history.

(56) References Cited

U.S. PATENT DOCUMENTS

| | | |
|---|---|---|
| 5,515,619 A | 5/1996 | Kahl et al. |
| 2003/0115773 A1* | 6/2003 | Lin .......................... D21F 11/14 34/446 |

FOREIGN PATENT DOCUMENTS

| | | |
|---|---|---|
| DE | 1045351 B | 4/1958 |
| DE | 2640571 A1 | 3/1978 |

(Continued)

OTHER PUBLICATIONS

International Search Report and Written Opinion of the International Searching Authority for International Application No. PCT/IB2022/000145 dated Jul. 7, 2022, 19 pages.

*Primary Examiner* — Michael N Orlando
*Assistant Examiner* — Joshel Rivera
(74) *Attorney, Agent, or Firm* — Pierce Atwood LLP

(57) ABSTRACT

A through-air apparatus for drying or bonding paper, tissue, or nonwoven webs is provided. The apparatus includes a web-carrying structure configured to move and a first component having at least one sealing element adjacent the web-carrying structure, where the sealing element is configured to reduce the infiltration of ambient air into the through-air apparatus. The apparatus also includes at least one channel configured to direct air to the sealing element to reduce the infiltration of ambient air into the through-air apparatus. A method of operating a through-air apparatus for drying or bonding paper, tissue, or nonwoven webs is also provided. The method includes directing air to a sealing element to reduce the infiltration of ambient air into the through-air apparatus.

20 Claims, 13 Drawing Sheets

(51) Int. Cl.
*F16L 3/02* (2006.01)
*F16L 5/02* (2006.01)
*F16L 11/12* (2006.01)
*F16L 45/00* (2006.01)
*F16L 57/00* (2006.01)
*F16L 59/14* (2006.01)

(56) References Cited

FOREIGN PATENT DOCUMENTS

| | | |
|---|---|---|
| DE | 4033901 A1 | 4/1992 |
| DE | 4314475 A1 | 12/1993 |
| JP | S57176291 A | 10/1982 |

* cited by examiner

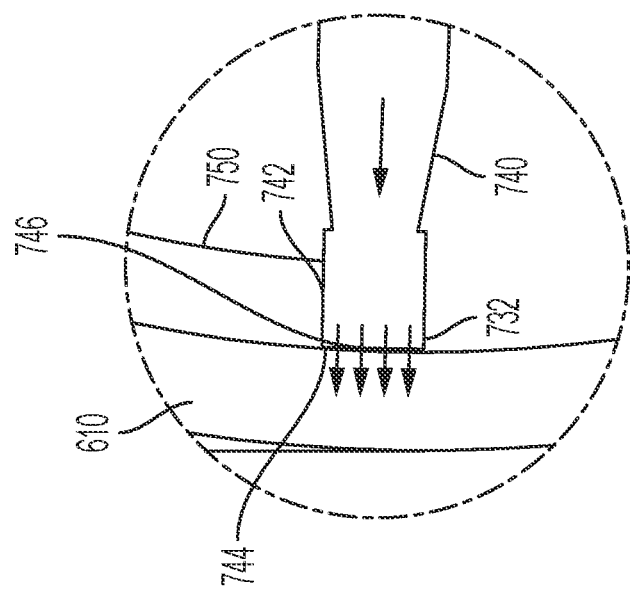
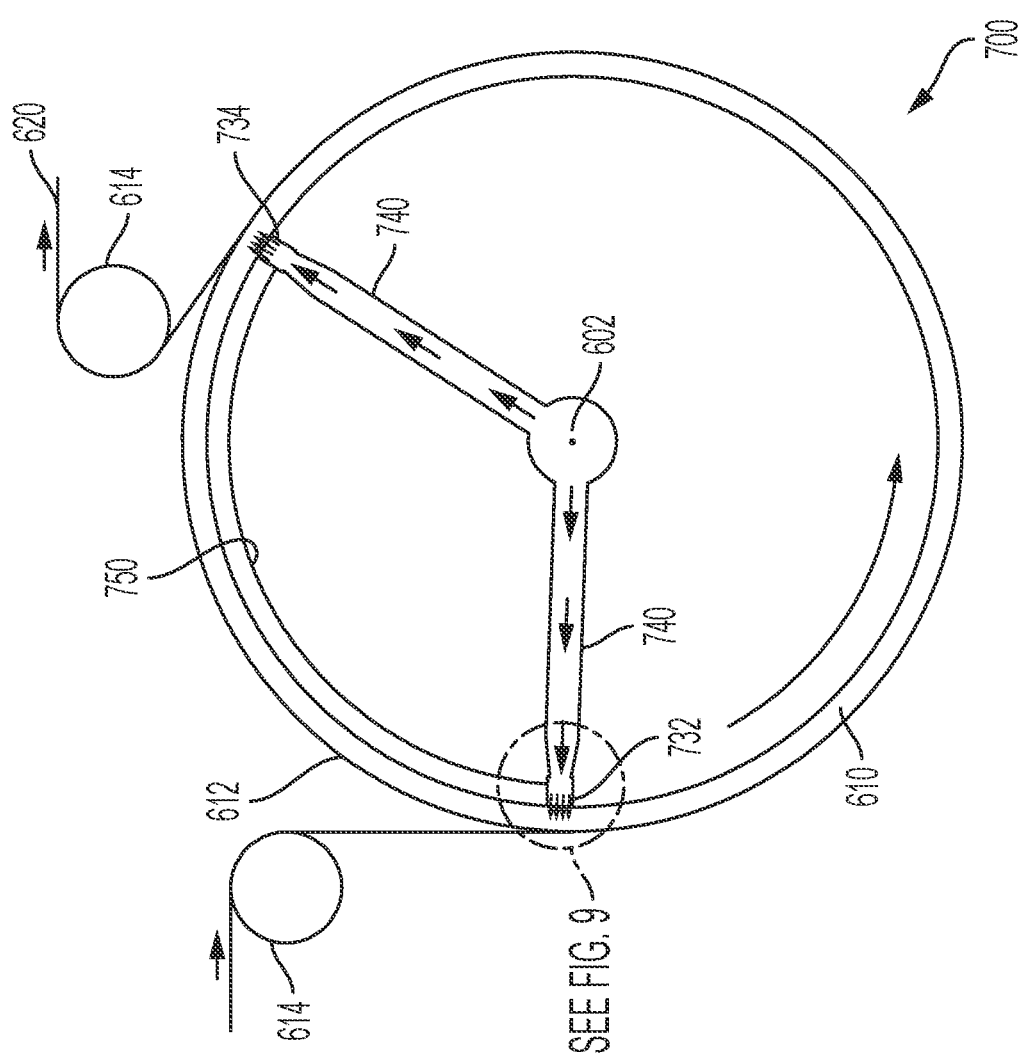
FIG. 9
FIG. 8

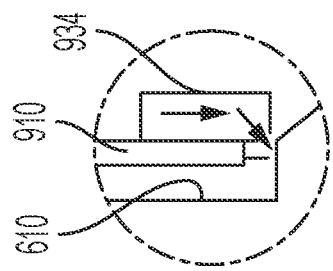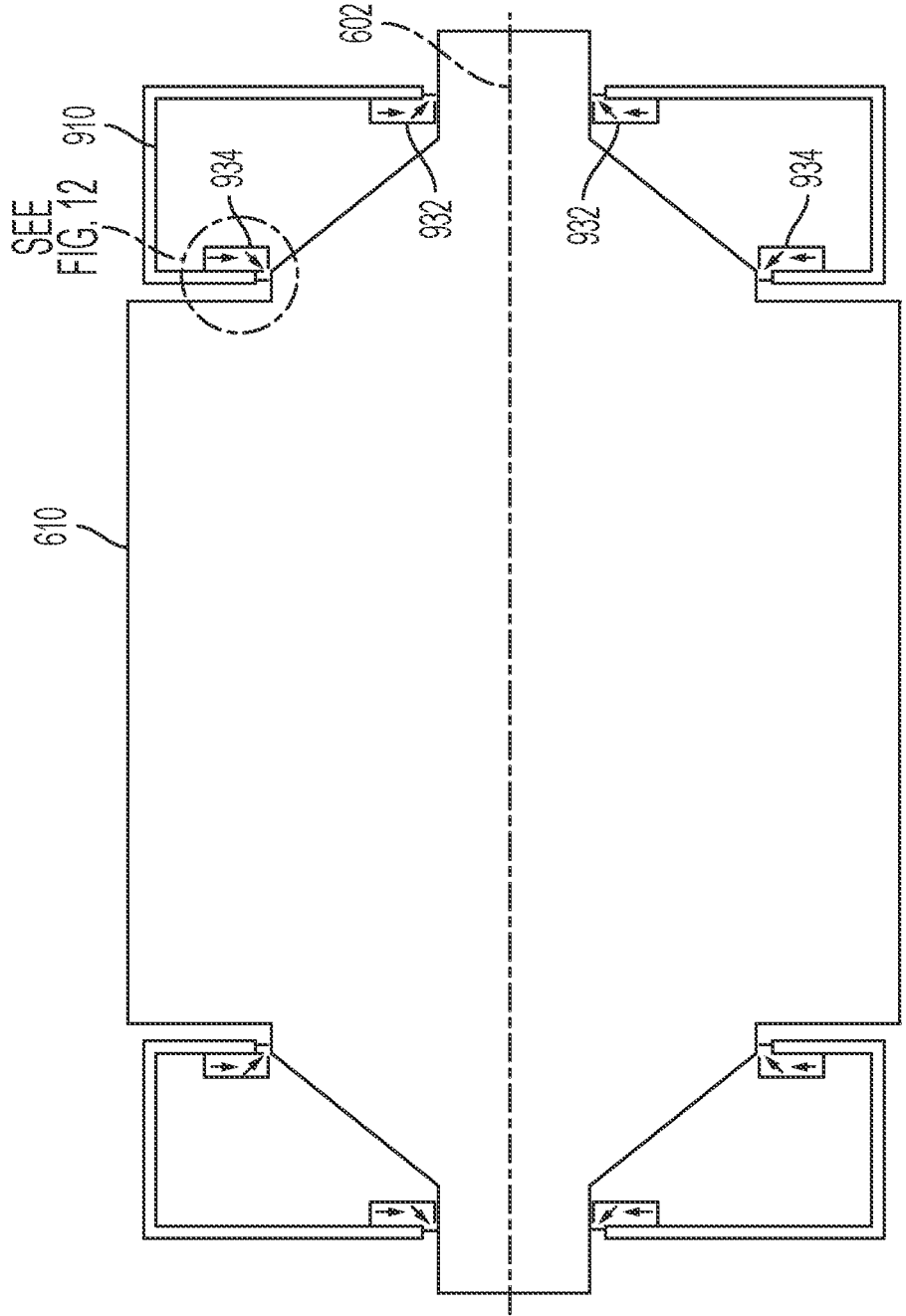

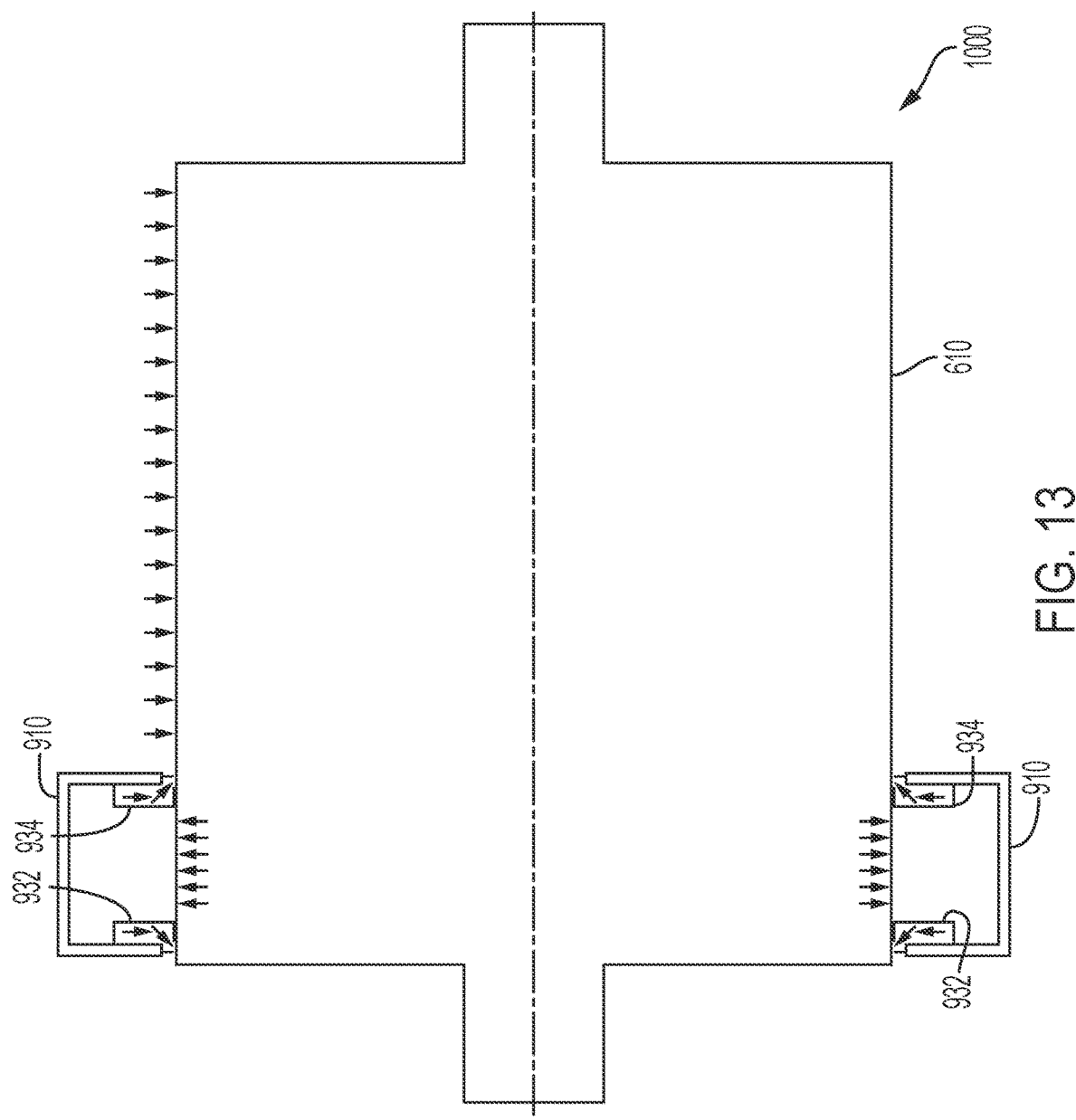

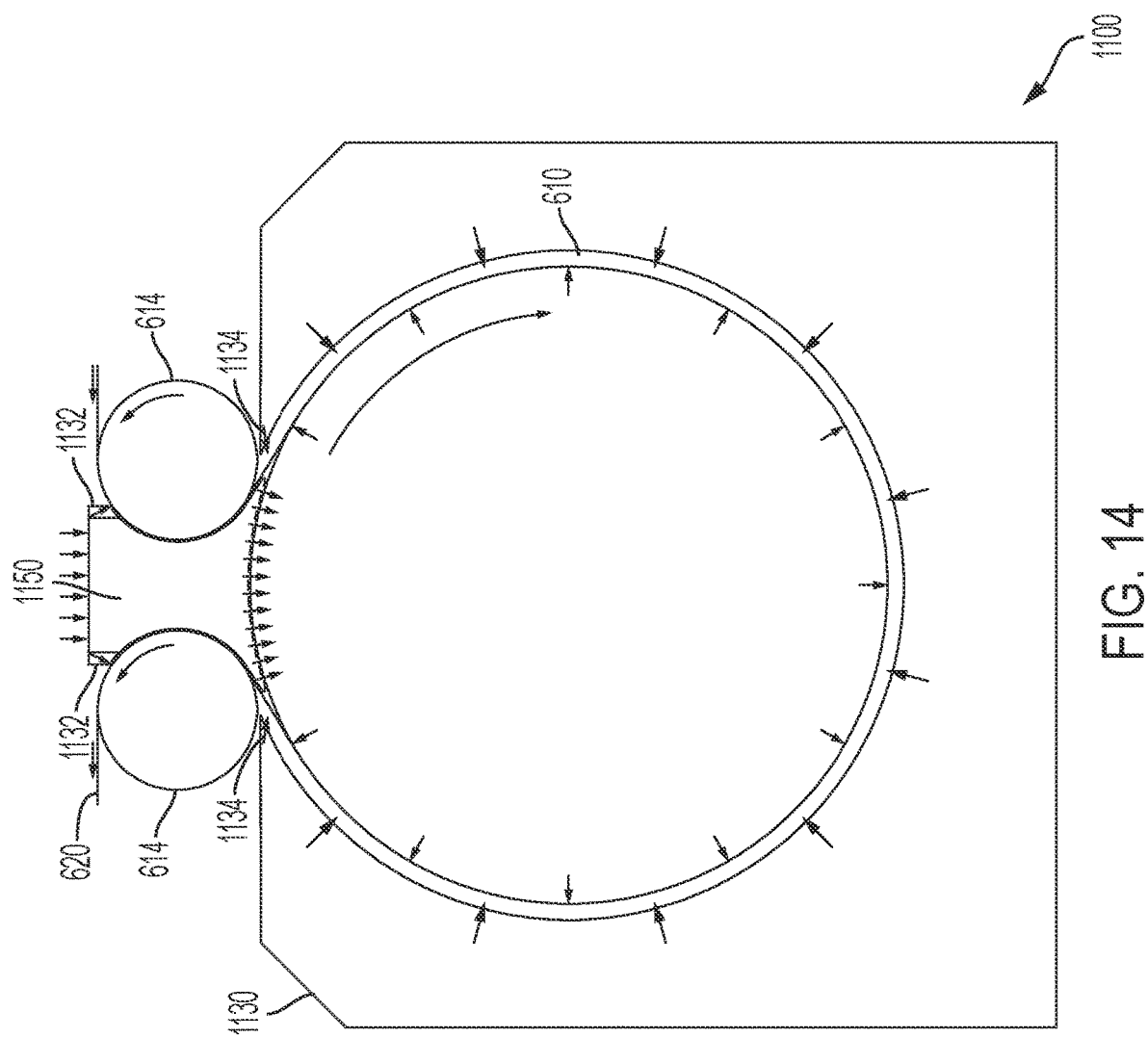

US 12,012,697 B2

THROUGH-AIR APPARATUS TO REDUCE INFILTRATION OF AMBIENT AIR

FIELD OF THE INVENTION

The invention relates, in part, to a through-air apparatus for manufacturing web products, and methods of use, which reduce the infiltration of ambient air into the through-air apparatus.

BACKGROUND

"Through air technology" is a term used to describe systems and methods enabling the flow of air through a paper, tissue, or nonwoven web for the purpose of drying or bonding fibers or filaments. Examples include the drying of nonwoven products (e.g., tea bags and specialty papers); drying and curing of fiberglass mat, filter paper, and resin-treated nonwovens; thermobonding and drying of spunbond nonwovens; drying hydroentangled webs; thermobonding geotextiles with or without bicomponent fibers; drying and curing interlining grades; and thermobonding absorbent cores with fusible binder fibers. The drying of tissue paper is also another application of through air technology.

Systems and methods related to through-air drying are commonly referred to through the use of the "TAD" acronym. Systems and methods related to through-air bonding are commonly referred to through the use of the "TAB" acronym.

A through-air apparatus generally includes a rigid air-permeable web-carrying structure. A web is placed on the web-carrying structure, and as the web-carrying structure moves, a fan may blow air through the wall of the web-carrying structure to treat the web. The web-carrying structure typically has a plurality of openings to permit the air to pass through the structure.

SUMMARY OF THE INVENTION

In a first aspect, a through-air apparatus for drying or bonding paper, tissue, or nonwoven webs is provided. The apparatus includes a web-carrying structure configured to move, and a first component having at least one sealing element adjacent the web-carrying structure, where the at least one sealing element is configured to reduce the infiltration of ambient air into the through-air apparatus. The apparatus also includes at least one channel configured to direct air to the at least one sealing element to reduce the infiltration of ambient air into the through-air apparatus.

In another aspect, a method of operating a through-air apparatus for drying or bonding paper, tissue, or nonwoven webs is provided. The method includes placing a web on a portion of a web-carrying structure, and moving the web-carrying structure such that the web moves with the web-carrying structure. The method also includes providing a first component having at least one sealing element adjacent to the web-carrying structure, where the at least one sealing element on the first component is configured to reduce the infiltration of ambient air into the through-air apparatus. The method further includes directing air to the at least one sealing element to reduce the infiltration of ambient air into the through-air apparatus.

In yet another aspect, a through-air apparatus for drying or bonding paper, tissue, or nonwoven webs is provided. The apparatus includes a rotating web-carrying structure including a carrying surface having a plurality of openings to permit the passage of air, and a web wrap angle defining angular active and inactive zones of the web-carrying structure and creating active and inactive air flow zones of the through-air apparatus. The apparatus also includes a stationary structure which the rotating web-carrying structure rotates relative to, the stationary structure including one or more sealing elements configured to reduce in-leak of ambient air into the active zone of the through-air apparatus relative to an otherwise identical structure lacking the one or more sealing elements. The apparatus further includes one or more channels for the delivery of recirculated air, or other heated air stream, to one or more of the sealing elements thereby further reducing the in-leak of ambient air into the active zone of the through-air apparatus.

BRIEF DESCRIPTION OF THE DRAWINGS

FIG. 8 is a cross-sectional view of a though-air apparatus according to another embodiment;

FIG. 9 is a detailed section view of the circled area shown in FIG. 8;

FIG. 11 is a cross-sectional side view of a though-air apparatus according to another embodiment which includes exhaust duct sealing elements;

FIG. 12 is a detailed section view of the circled area shown in FIG. 11;

FIG. 13 is a cross-sectional side view of a through-air apparatus according to another embodiment which includes radial exhaust duct sealing elements;

FIG. 14 is a cross-sectional view of a through-air apparatus according to another embodiment which includes an outward flow-through arrangement;

DETAILED DESCRIPTION

The present disclosure is directed to a through-air apparatus configured to manufacture various products, such as paper, tissue, and/or nonwoven webs. One of ordinary skill in the art would recognize that the through-air apparatus may be configured as a through-air dryer (TAD) and/or a through-air bonder (TAB), depending on the context in which the apparatus is used. One of ordinary skill in the art will also recognize that the through-air apparatus may be used to make various web products that are rolled in their finished end product form. It should also be recognized that the product may not be rolled and/or may be cut into a finished end product. Furthermore, one of ordinary skill in the art will also recognize that the through-air apparatus may be configured to make various products, including, but not limited to various films, fabric, or other web type material, and the apparatus may be used for various processes that may include mass transfer, heat transfer, material displacement, web handling, and quality monitoring, including, but not limited to drying, thermal bonding, sheet transfer, water extraction, web tensioning, and porosity measurement.

Figure 15:
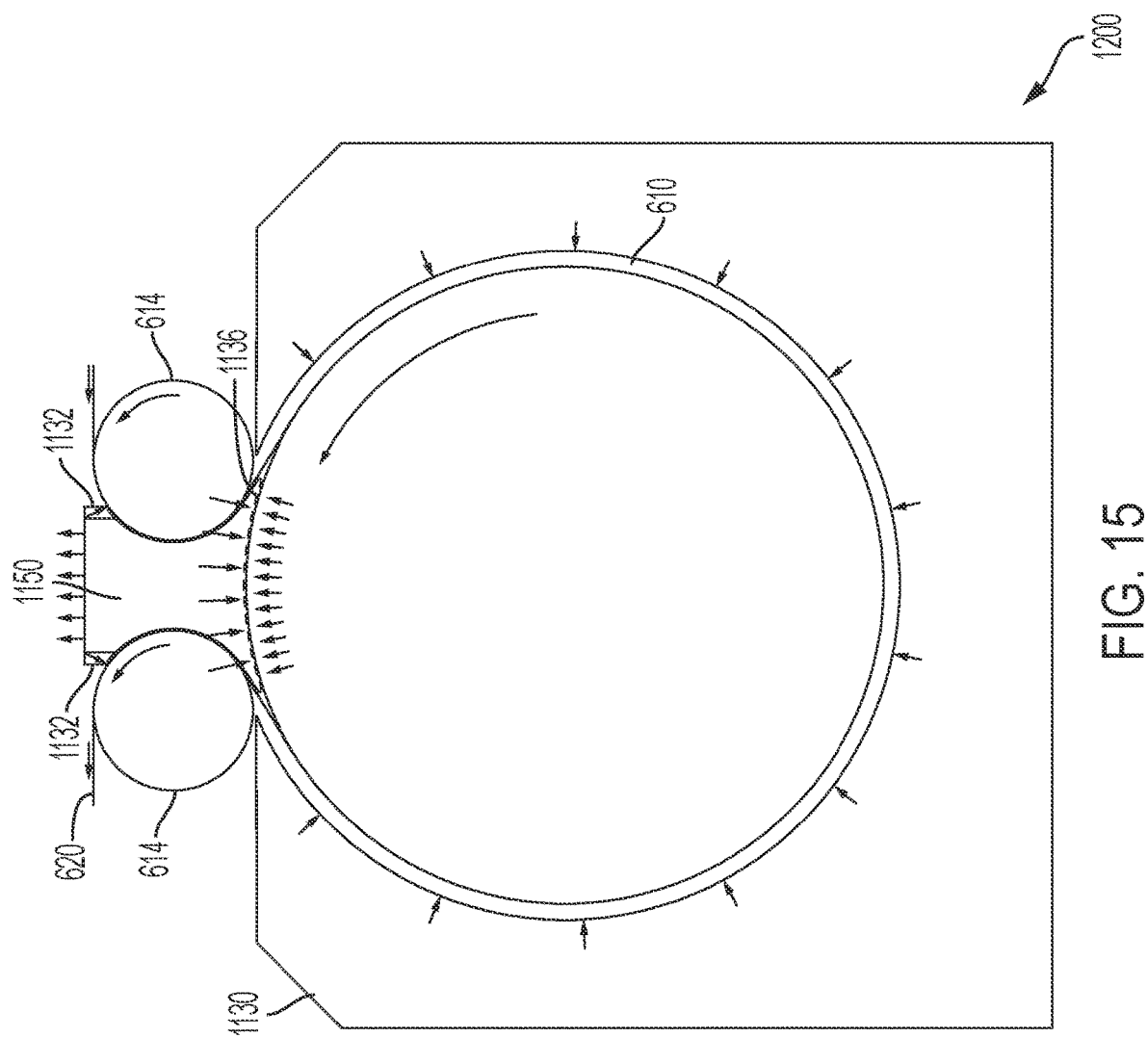
FIG. 15 is a cross-sectional view of a through-air apparatus according to another embodiment which includes an inward flow-through arrangement.
Figure 16:
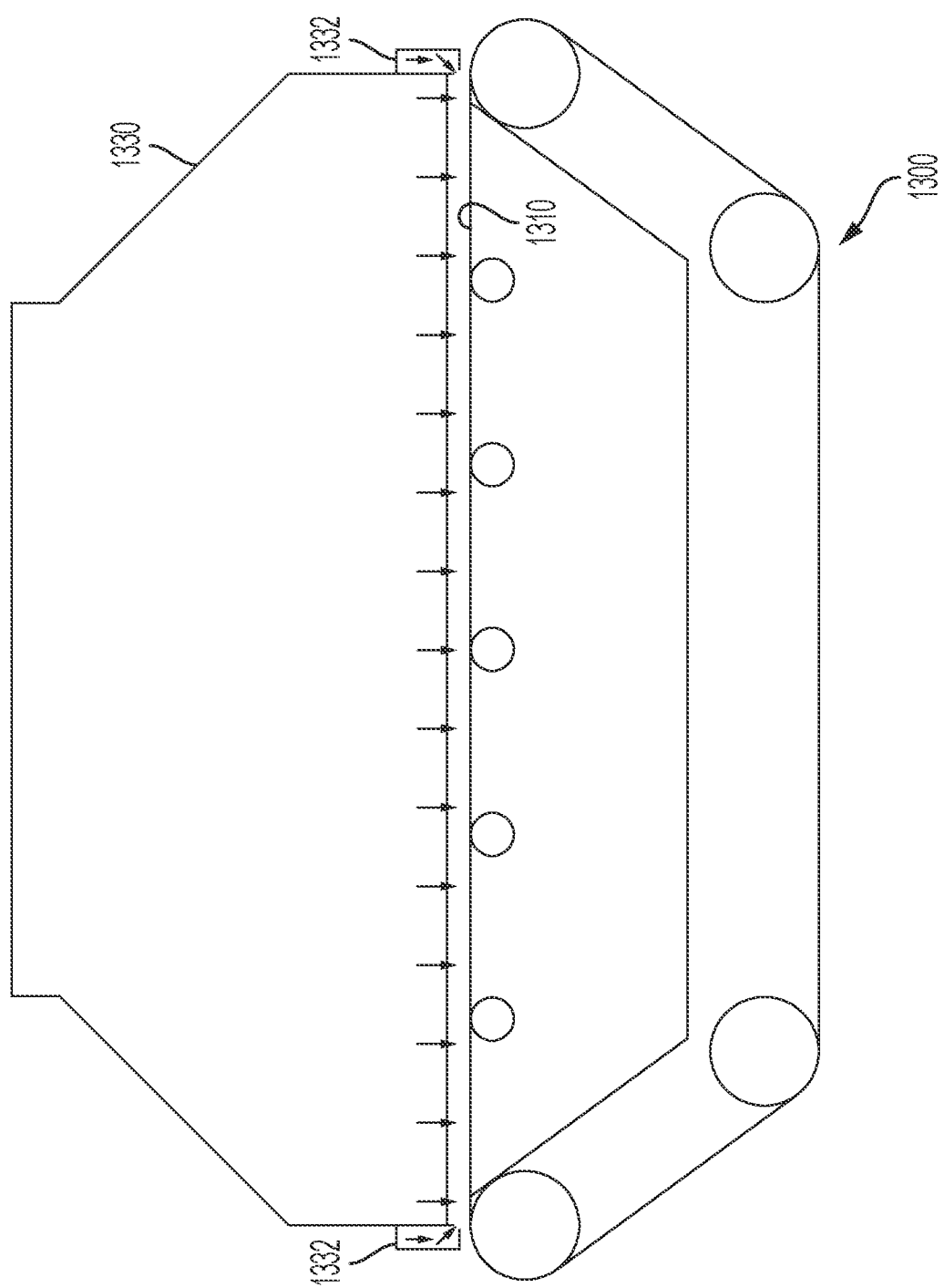
FIG. 16 is a cross-sectional view of a through-air apparatus according to another embodiment which includes a flatbed configuration.

As set forth in more detail below, the through-air apparatus includes a rigid air-permeable web-carrying structure configured to move relative to another portion of the apparatus. A web is placed on the web-carrying structure, and as the web moves, a fan may blow air through the wall of the web-carrying structure to treat the web. The web-carrying structure typically has a plurality of openings to permit the air to pass through the structure. As discussed in more detail below and as shown in FIG. 6-15, in certain embodiments, the web-carrying structure is a through-air roll configured for rotational movement about a first axis. As discussed below and as shown in FIG. 16, in another embodiment, the web-carrying structure is a flatbed belt configured for translational movement along either a horizontal or inclined plane. It should be appreciated that the below described configurations may be incorporated into various types of through-air apparatus configurations that employ web-carrying structures that are configured for rotational and/or translational movement, as the disclosure is not limited in this respect.

In one particular embodiment, a web (i.e. product) is typically in a sheet-form and it is partially wrapped around a cylindrical shell (i.e. through-air roll) of the through-air apparatus. The web is wrapped about a portion of the roll ranging from, for example, 90° to 360°, and typically between 180°-300° around the roll. The cylindrical wall of the through-air roll typically has a plurality of openings configured for air to pass through. A fan/blower is used to circulate the air across the product, and the through-air roll is typically positioned within a hood to optimize the air flow characteristics. As the product travels with the rotating shell through the active zone of the apparatus, the fan/blower circulates air through the wall of the cylindrical shell to treat the product. A heater may be provided so that heated air circulates through the through-air roll.

Figure 1:
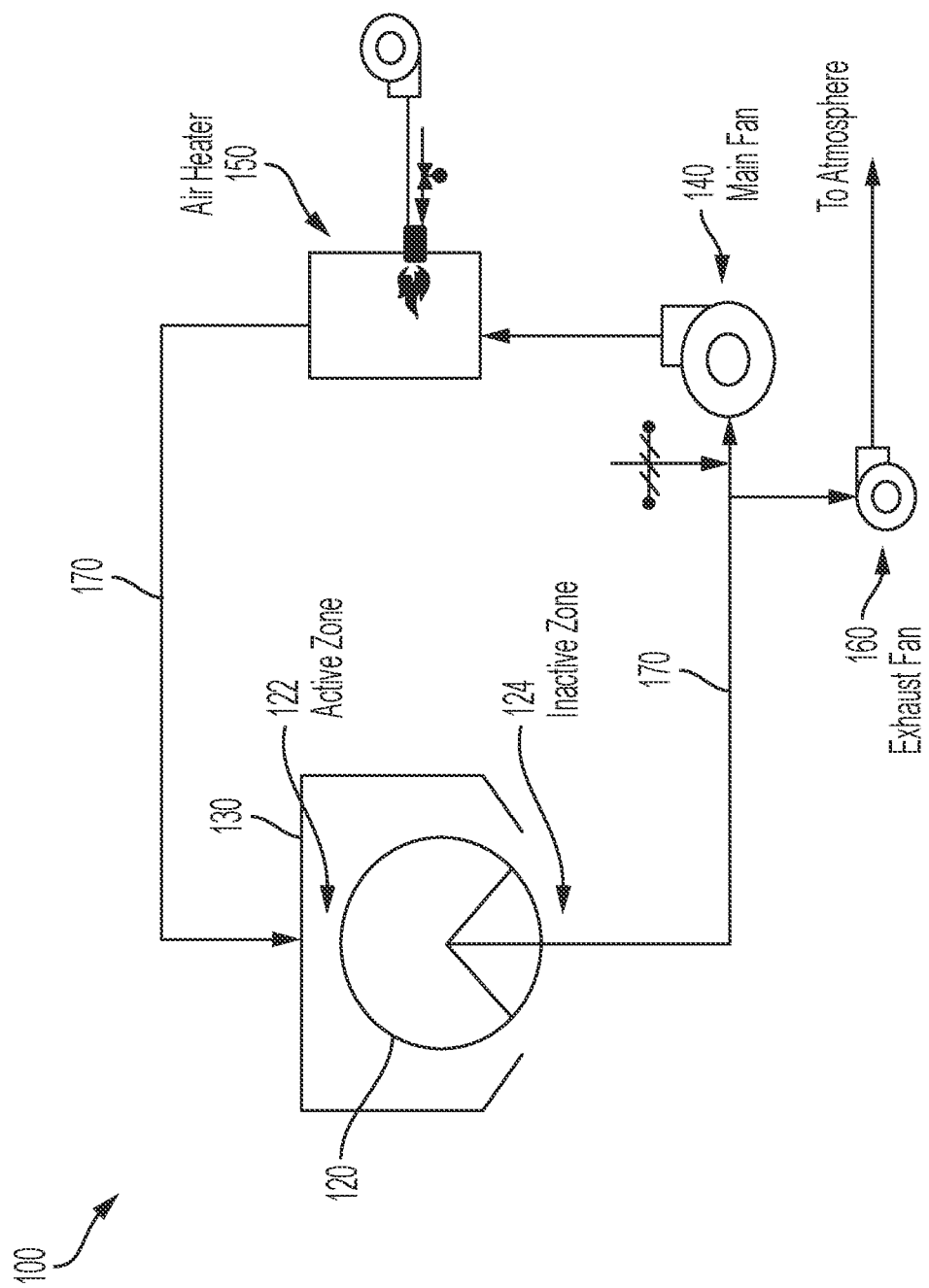
FIG. 1 is a schematic diagram of a conventional through-air apparatus system.

A conventional through-air apparatus system diagram is illustrated in FIG. 1. As shown, the through-air apparatus 100 includes a though-air roll 120 that is configured to rotate within a hood 130. The system includes a main fan 140 that directs system air (also known as process air) through conduit 170 and into hood 130 and then draws the air into the through-air roll 120. As shown, an air heater 150 may also be coupled to the conduit 170 to direct heated air into the through-air roll 120. The system may also include an exhaust fan 160 to draw air out of the apparatus 100 through conduit 170 to vent to atmosphere. As shown in FIG. 1, there is a closed loop of system air that flows from the main fan 140 through the conduit 170, into the hood 130, through the through-air roll 120, out an exhaust duct and through conduit 170.

A through-air apparatus 100 is typically a very large machine. For example, the through-air roll 120 may have a length between 1 foot-30 feet, and a diameter between 1 foot-22 feet. The cylindrical wall of the roll 120 may be formed of an open rigid structure to permit the flow of air therethrough. In one embodiment, the through-air roll 120 may be a HONEYCOMB ROLL® obtained from Valmet, Inc.

As mentioned above, the through-air apparatus 100 has an active air flow zone which is configured to receive the system air to treat the web. As shown in FIG. 1, this active air flow zone is defined, in part, by the portion of the through-air roll 120 that is configured to receive the web product. As also shown in FIG. 1, the through-air apparatus also has an inactive air flow zone which is defined, in part, by the portion of the through-air roll 120 that is not configured to receive the web product. As set forth in more detail below, these active and inactive zones may vary depending upon on how the web is wrapped around the through-air roll 120.

The inventors recognized problems associated with the conventional through-air apparatus 100 shown in FIG. 1. In particular, the inventors recognized that there was undesirable in-leak of ambient air into the through-air apparatus 100. As set forth in more detail below, there is typically a space, or a gap between the web-carrying structure and adjacent components of the through-air apparatus 100 to enable movement of the web-carrying structure. This gap is generally between about 0.06 inches-0.375 inches. In this particular embodiment shown in FIG. 1, the web-carrying structure is a rotating through-air roll 120. One or more sealing elements (discussed below) may be provided on these adjacent components to reduce in-leak of ambient air. Nevertheless, infiltration of ambient air into the through-air apparatus still occurs in these locations. The inventors recognized that currently there is a limitation on how small the seal clearances can be set due to various factors, such as, the through-air roll size, width, operating vacuum, rotation speed, and loads. As set forth in more detail below, aspects of the present disclosure are directed to reducing and controlling this in-leak of ambient air into the through-air apparatus.

As set forth in more detail below, aspects of the present disclosure include directing air to at least one sealing element on one or more components of the through-air apparatus to reduce the infiltration of ambient air into the through-air apparatus. As discussed below, the air which is directed to the sealing element may be sourced from a variety of locations, including, but not limited to, recirculating the system air from another portion of the through-air apparatus system. In one embodiment, the air is sourced from the exhaust line of the through-air apparatus. Other air sources are also contemplated and are discussed below. For example, both heated and non-heated air sources not specifically within the through-air apparatus system may also be employed. As set forth below, at least one channel is provided in the through-air apparatus to direct this air to the sealing element.

The inventors contemplate that the present disclosure may have a variety of advantages. First, the concepts of the present disclosure may be employed to increase the energy efficiency of a through-air apparatus by recycling exhaust air, minimizing heat loss within, and/or reducing the infiltration of ambient air into the through-air apparatus. Second, the concepts discussed therein may be used to help regulate and/or control the system air humidity levels within the through-air apparatus. Third, the concepts of the present disclosure may enable larger gaps/spaces between the sealing elements and the web-carrying structure in comparison to a traditional through-air apparatus.

Details of various embodiments are described below, but first a high level overview of the various through-air apparatus schematic diagrams shown in FIGS. 2-5 contemplated by the inventors will be described.

The inventors developed novel through-air apparatus configurations that reduce the infiltration of ambient air into the through-air apparatus. As set forth in more detail below, the apparatus includes one or more channels for the delivery of air to one or more sealing elements. FIGS. 2-5 illustrate various schematic diagrams of through-air apparatus systems that illustrate the various sources of air contemplated by the present disclosure. FIGS. 6-16 (described below) illustrate various channel configurations within the through-air apparatus that direct the air to the sealing elements.

Figure 2:
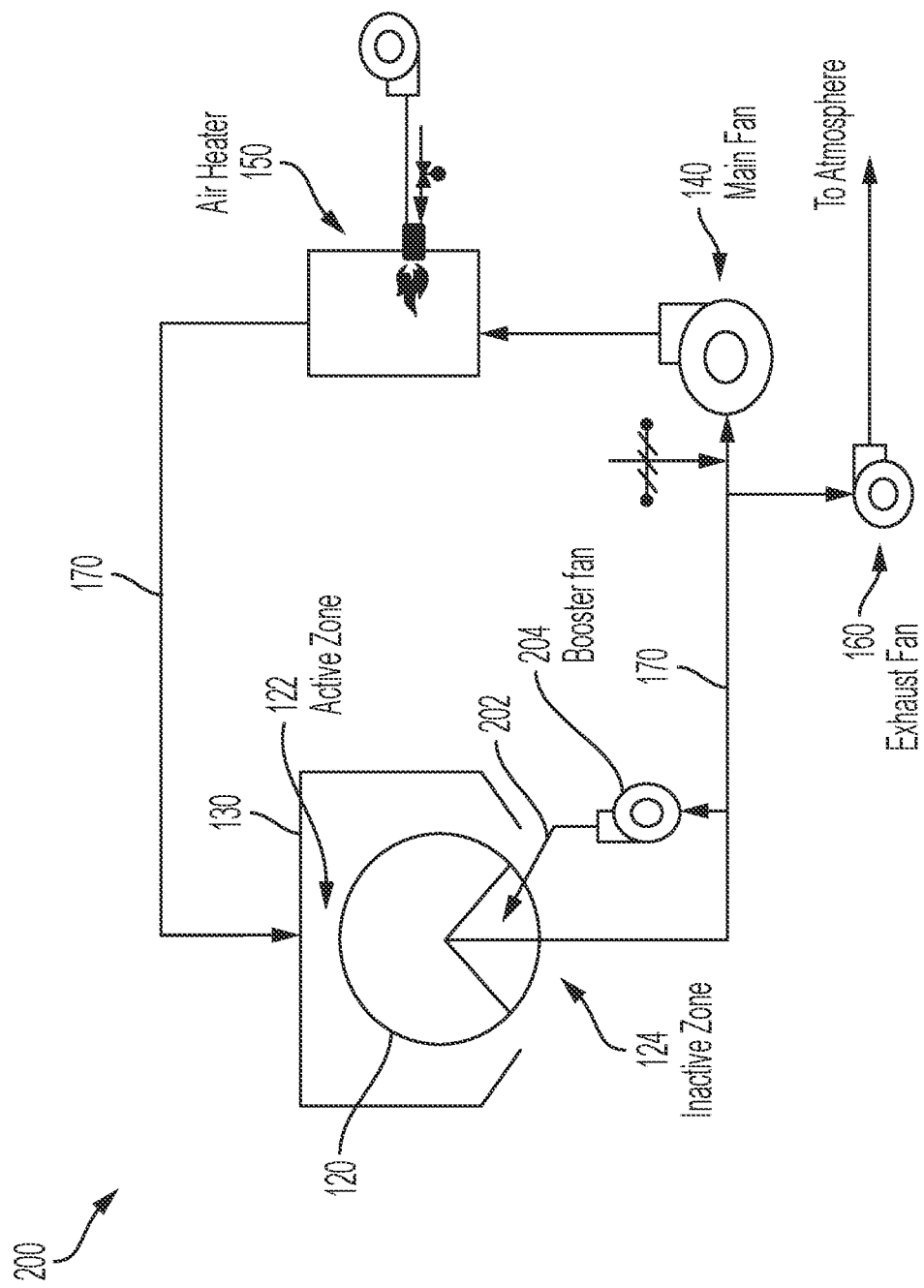
FIG. 2 is a schematic diagram of a through-air apparatus system according to one embodiment with recirculation of air from within the apparatus system.

FIG. 2 illustrates a schematic diagram of one embodiment of a through-air apparatus system where heated air is delivered to at least one sealing element via a booster fan 204. Similar to FIG. 1, the through-air apparatus 200 includes a though-air roll 120 that is configured to rotate within a hood 130. As shown, in one embodiment, the web-carrying structure is a through-air roll 120. As set forth in more detail below and as shown in FIG. 16, in another embodiment, non-rotating configurations are contemplated, and the web-carrying structure may include a flatbed belt configured for translational movement. As shown, a main fan 140 directs system air into the through-air apparatus 200 through conduit 170 and an air heater 150 may be employed to direct heated air into the through-air apparatus 200. Furthermore, an exhaust fan 160 may be used to draw air out of the apparatus 200.

Most notably, unlike the conventional apparatus shown in FIG. 1, the through-air apparatus 200 shown in FIG. 2 further includes an additional conduit 202 that includes a booster fan 204. As described in more detail below, the conduit 202 and booster fan 204 are configured to direct air to at least one sealing element in the through-air apparatus 200. Details regarding how the air is directed to the sealing element is shown in FIGS. 6-16 and is described in more detail below. As shown, in FIG. 2, the conduit 202 and booster fan 204 are used to specifically direct exhaust air from conduit 170 back into the at least one sealing element in the through-air apparatus 200 to reduce the infiltration of ambient air into the through air apparatus 200.

Figure 3:
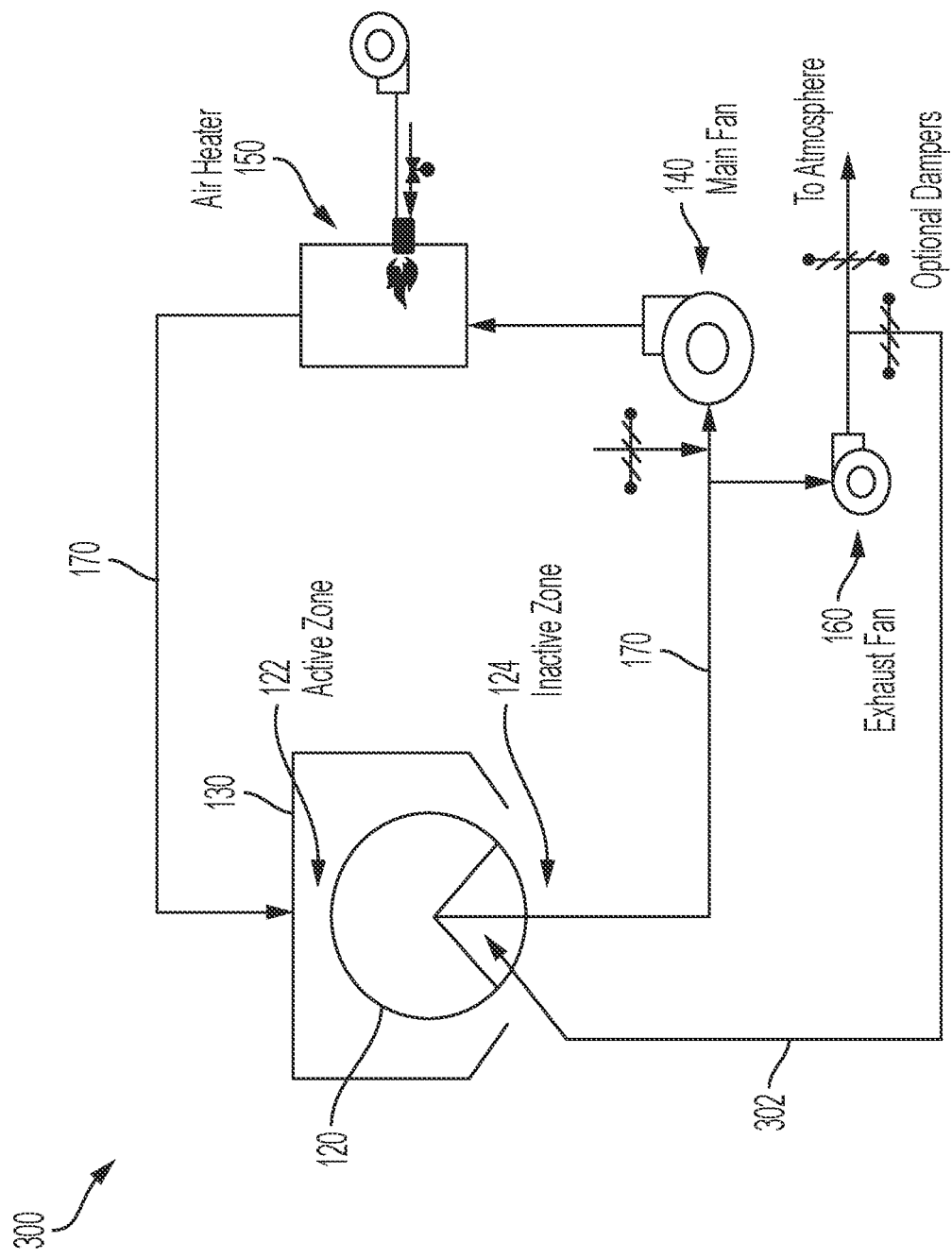
FIG. 3 is a schematic diagram of a through-air apparatus system according to another embodiment with recirculation of air from within the apparatus system.
Figure 4:
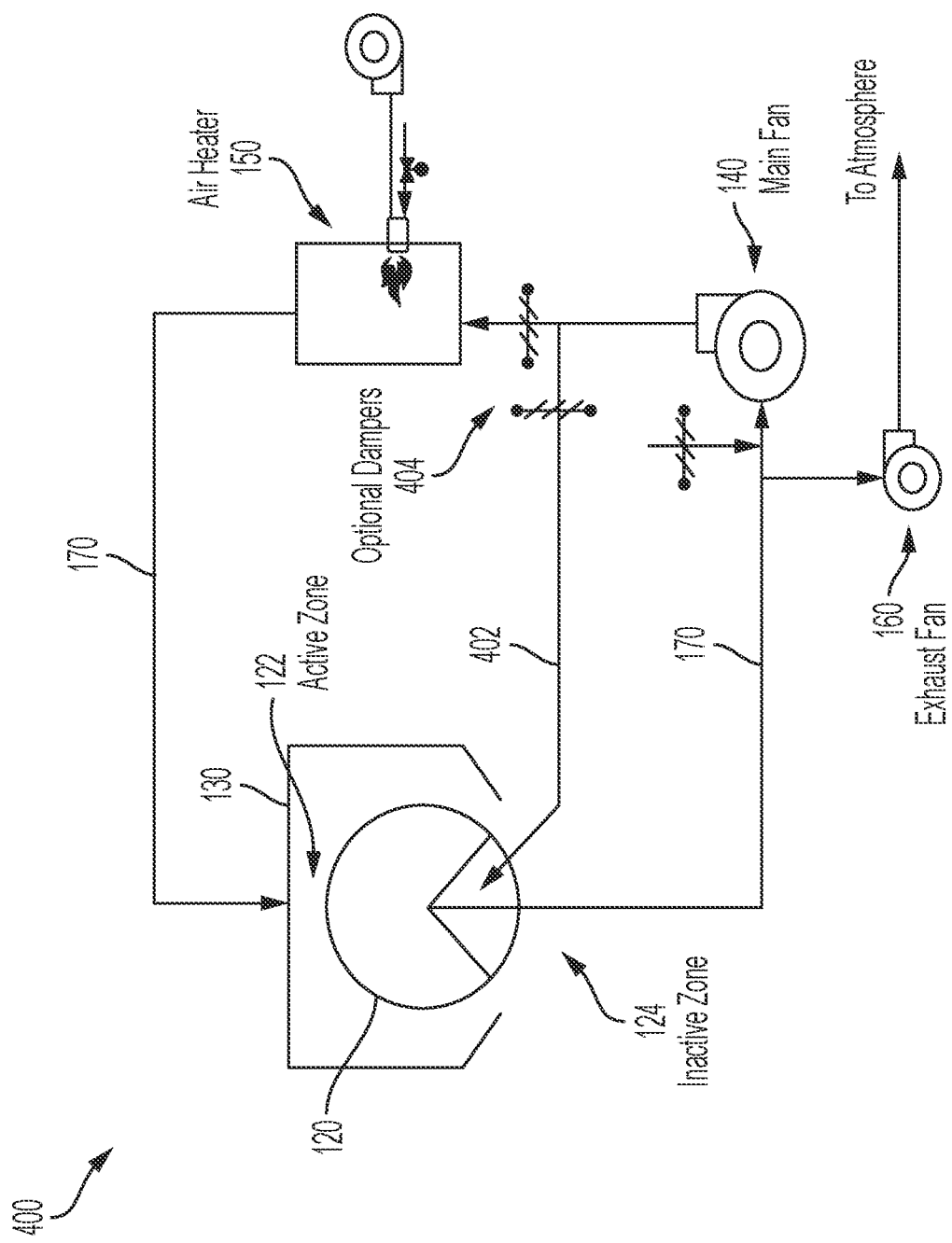
FIG. 4 is a schematic diagram of a through-air apparatus system according to another embodiment with recirculation of air from within the apparatus system.

FIG. 3 illustrates a schematic system diagram of another embodiment of a through-air apparatus 300. FIG. 3 is identical to FIG. 2, except that instead of the conduit 202 and booster fan 204 shown in FIG. 2, the embodiment in FIG. 3 illustrates conduit 302 which is used to recirculate heated exhaust air to a sealing element in the through-air apparatus 300. As mentioned above, details regarding how the air may be specifically directed to the sealing element is shown in FIGS. 6-16 and described in more detail below. In this embodiment, the conduit 302 is positioned downstream of the exhaust fan 160, so that the exhaust fan 160 can be used to direct the air to a sealing element. Thus, in this particular embodiment, a separate booster fan 204 is not required.

The present disclosure also contemplates configurations where the air that is directed to the sealing element is not sourced specifically from the exhaust line. For example, as shown in the schematic system diagram shown in FIG. 4, in one embodiment, the present disclosure contemplates a configuration where the air that is directed to the sealing element is delivered via the main fan 140. As illustrated, a conduit 402 is provided which branches off from conventional conduit 170 between the main fan 140 and the air heater 150. As set forth in more detail below, conduit 402 is configured to direct air to one or more sealing elements on the through air apparatus 400. As also discussed in more detail below, the conduit 402 may include one or more flow control features, such as dampers 404, to control the amount of air that flows to the sealing element, which may enable one to control/regulate humidity levels of the system air.

Figure 5:
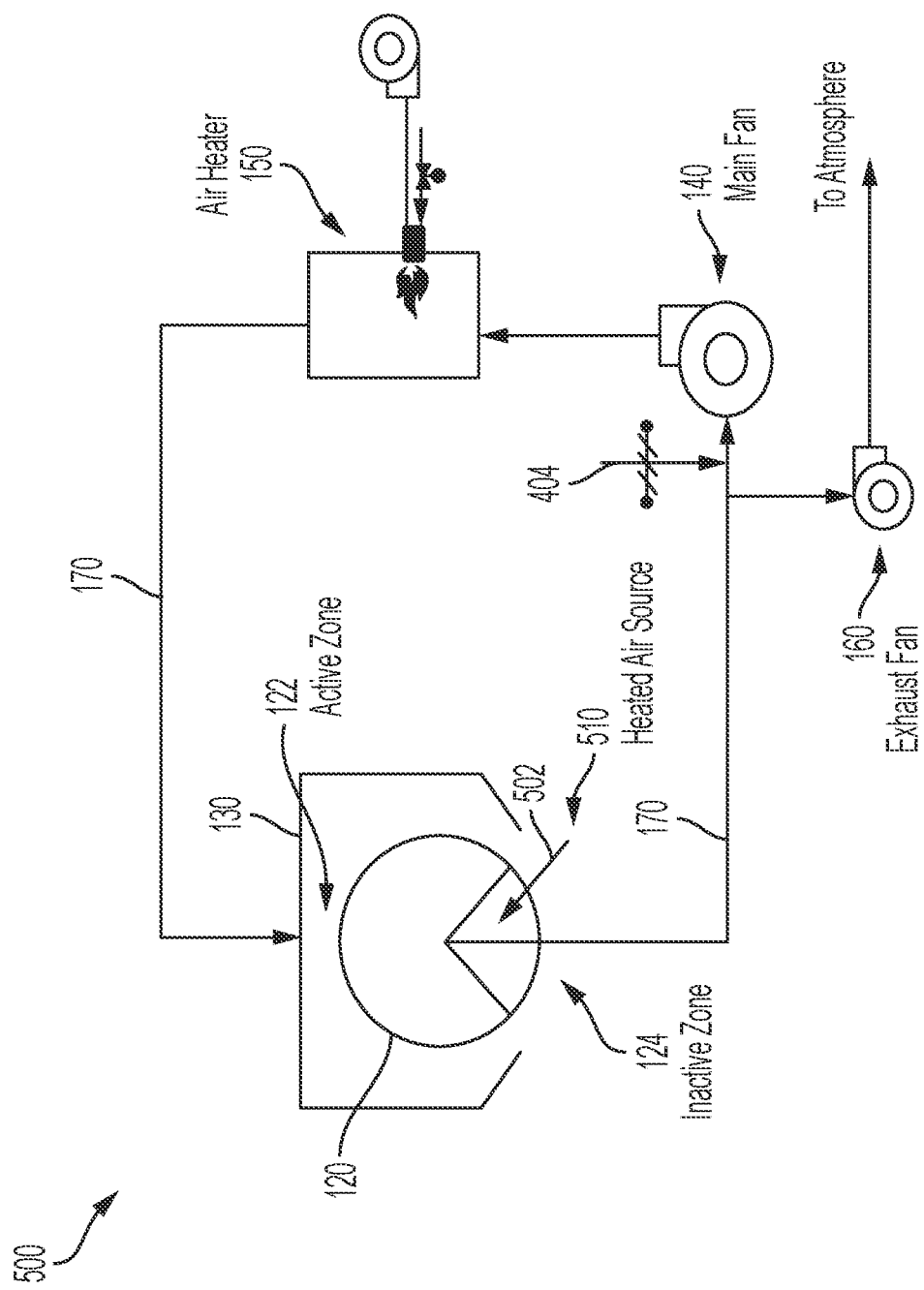
FIG. 5 is a schematic diagram of a through-air apparatus system according to yet another embodiment with recirculation of air from an outside air source.

FIG. 5 illustrates a schematic diagram of another through-air apparatus system according to yet another embodiment. In this embodiment, air is delivered to the sealing element via a heated air source 510, outside of the system air of the through-air apparatus system. Non-heated heat sources are also contemplated as the disclosure is not so limited. As shown, conduit 502 is configured to direct heated air from the heated air source 510 to the sealing element of the through-air apparatus 500. For example, in one embodiment, the air source 510 may include pre-heated ambient air, turbine exhaust gas, Yankee hot air system exhaust air, vacuum pump exhaust air, other heated air streams in a paper machine or mill environment, or any other hot air source. Other embodiments may include non-heated air sources, as the present disclosure is not limited in this respect.

As shown in FIGS. 2-5, the present disclosure contemplates various configurations where air is obtained from different sources (both within the through-air apparatus system and also from external sources outside of the system air of the through-air apparatus system), and the air is then directed into the through-air apparatus to at least one sealing element. Turning now to FIGS. 6-16, details regarding how the air may be specifically directed to the one or more sealing elements on the through-air apparatus will now be described in more detail.

Figure 6:
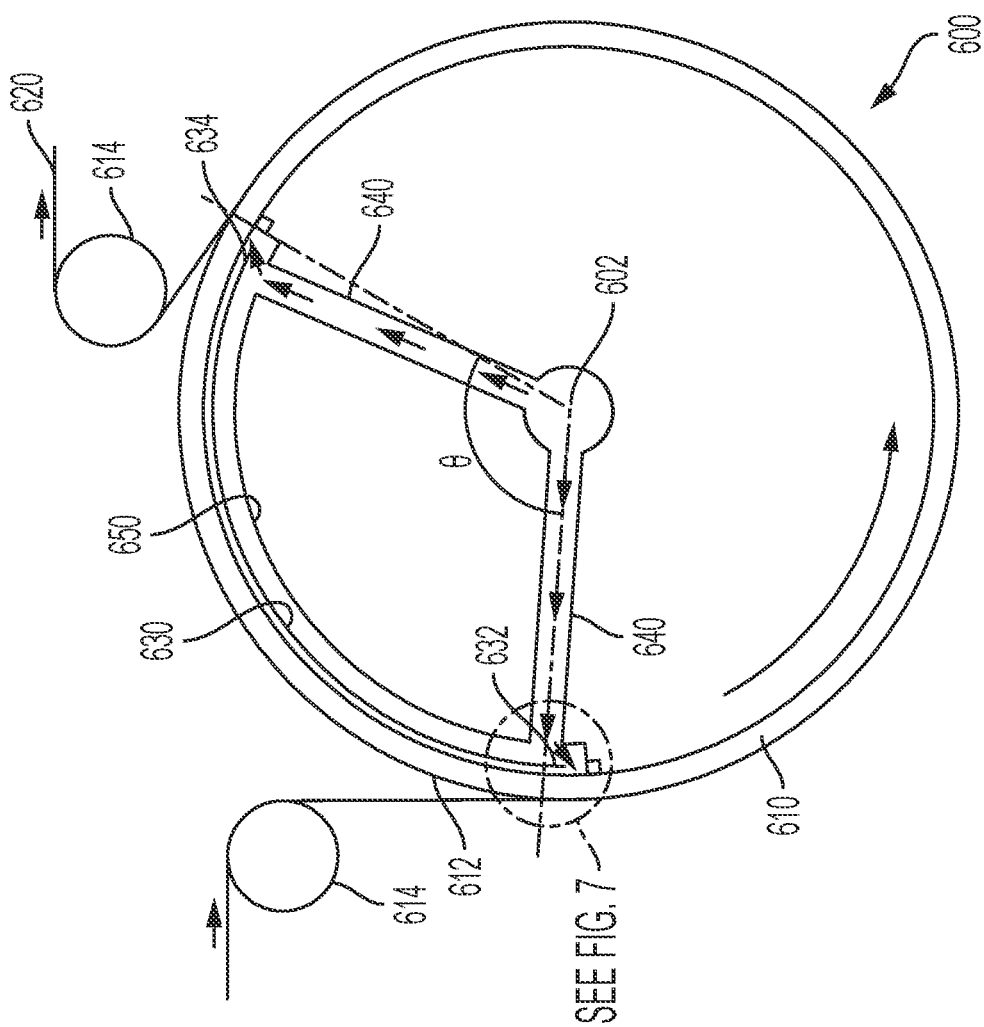
FIG. 6 is a cross-sectional view of a though-air apparatus according to one embodiment.

FIG. 6 illustrates a through-air apparatus 600 which includes a through-air roll 610 (i.e. rotating web-carrying structure) which is configured to rotate about a first axis 602. As shown, a web 620 is wrapped around the roll 610. The through-air roll 610 has a carrying surface 612 which has a plurality of openings to permit the passage of air. The apparatus 600 may also include rollers 614 which may assist in transfer of the web 620 onto and off of the roll 610. A web wrap angle θ defines angular active and inactive zones of the web-carrying structure. As shown in FIG. 6, the rollers 614 are positioned such that the inactive zone web wrap angle θ is about 110°, and thus, the active zone web angle is about 250°. One of ordinary skill in the art will recognize that these angles can vary as the present disclosure is not limited in this respect.

One of ordinary skill in the art will also recognize that these inactive and active zones of the web-carrying structure create corresponding active and inactive air flow zones of the through-air apparatus. As mentioned above, the active air flow zone of the through-air apparatus is the portion configured to receive the system air to treat the web. The active air flow zone of the through-air apparatus may be defined as an area which includes the web wrapped about the roll 610 and surrounding areas configured to receive system air through the conduit 170 (see FIG. 1). In contrast, the inactive air flow zone of the through-air apparatus may be defined as the area which does not include the web wrapped about the roll 610.

The through-air roll 610 may rotate relative to another component, such as a stationary structure of the through-air apparatus. As set forth in more detail below, the stationary structure may include a variety of components, such as, but not limited to, an internal baffle, an inactive zone blocking plate, an exhaust duct, a plenum, and/or a hood radial or cross-machine stationary skirt. One of ordinary skill in the art would recognize that the stationary structure and its associated sealing elements may be made of various materials such as, but not limited to, Teflon, metal, and plastic. As set forth in more detail below, in one embodiment, the sealing elements are terminus locations and/or edges of the stationary structure.

Figure 7:
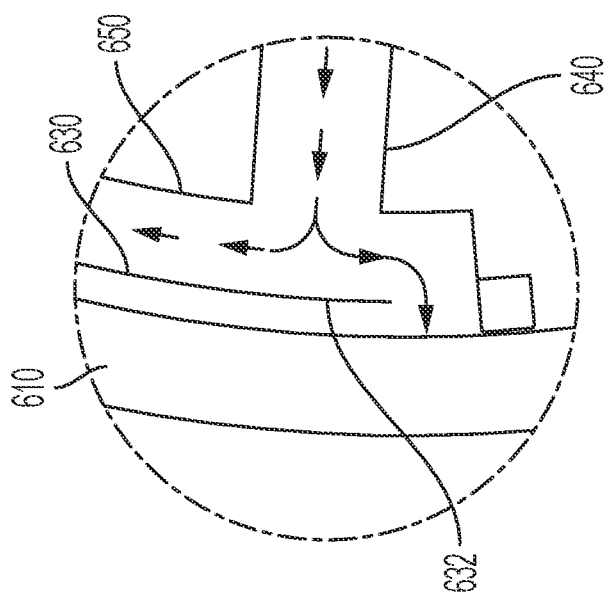
FIG. 7 is a detailed section view of the circled area shown in FIG. 6.

The specific embodiment disclosed in FIGS. 6-7 illustrate a configuration where the stationary structure includes an inactive zone blocking plate 630. As shown, the inactive blocking plate 630 is coupled to the baffle 650 and the plate 630 is configured to cover the inactive zone of the through-air roll 610 to prevent the in-leak of ambient air. As shown, the inactive blocking plate 630 may be a curved piece that matches the contour of the through-air roll 610. In another embodiment, the blocking plate may be a flat piece.

In the embodiment shown in FIGS. 6-7, the blocking plate 630 includes at least one sealing element. In this particular illustrative embodiment, there is a first sealing element 632 located at one end of the inactive zone, and a second sealing element 634 located at the other end of the inactive zone. One of ordinary skill in the art will recognize that the first and second sealing elements 632, 634 are configured to reduce in-leak of ambient air into the active zone of the through-air apparatus, relative to an otherwise identical structure lacking the sealing elements. Furthermore, additional sealing elements (not shown) may also be provided around the circumference of the blocking plate 630. As illustrated in FIGS. 6-7, in one embodiment, the sealing elements 632, 634 are terminus locations and/or edges of the blocking plate 630. In another embodiment, the sealing elements may include other portions of the stationary structure, and it is also contemplated that the sealing elements may not be integrally formed with the stationary structure. As shown in FIG. 6, and also as shown in the detailed view shown in FIG. 7, one or more channels 640 are provided for the delivery of recirculated air, or other air stream, to at least one sealing element 632, 634 thereby further reducing the in-leak of ambient air into the active zone of the through-air apparatus 600. As shown, in one embodiment, the channel 640 is inside of the through-air roll 610. As set forth below, in another embodiment, at least a portion of the channel 640 which is configured to direct air to one or more sealing elements may be positioned outside of the through-air roll 610.

As shown in FIGS. 6-7, at least one channel 640 extends radially outwardly from the first axis 602 towards a circumference of the through-air roll 610. As shown, a first channel 640 extends outwardly towards the first sealing element 632 and a second channel 640 extends outwardly towards the second sealing element 634. In another embodiment, one continuous channel 640 may be provided. In one embodiment, at least a portion of the channel 640 may extend along the first axis 602 (i.e. axis of rotation of the through-air roll 610. It is contemplated that exhaust air, or some other system air from the through-air apparatus, may be circulated through the channel along the axis 602 and then radially out to the sealing elements 632, 634. As shown by the path of arrows in FIGS. 6-7, the air may be directed radially outwardly towards the rotating through-air roll 610. As shown, some of the air may also be directed substantially parallel to the inside surface of the blocking plate 630, and may be configured to evenly distribute the air along the perimeter of the blocking plate 630. The channels 640 may be designed with dampers, or other known flow controlling devices, to allow for even distribution of the recirculated air to the edge of the blocking plate sealing elements 632, 634.

The present disclosure also contemplates configurations where, for example, there are third and fourth sealing elements and one or more additional channels 640 extending out to the additional sealing elements to thereby further reduce the in-leak of ambient air into the active zone of the through-air apparatus. It should be appreciated that in one embodiment, the blocking plate 630 is rectangular shaped and has a sealing element associated with each of its four sides. One or more channels 640 may be configured to deliver the recirculated air, or other air stream to the sealing elements.

Another embodiment of a through-air apparatus is illustrated in FIGS. 8-9. Some of the components in FIGS. 8-9 are similar to the components discussed above with respect to the embodiment shown in FIGS. 6-7, and thus have identical reference numbers. FIGS. 8-9 illustrate a through-air apparatus 700 which includes a through-air roll 610 (i.e. rotating web-carrying structure) which is configured to rotate about a first axis 602. As shown, a web 620 is wrapped around the roll 610. The through-air roll 610 has a carrying surface 612 which has a plurality of openings to permit the passage of air. The apparatus 700 may also include rollers 614 which may assist in transfer of the web 620 onto and off of the roll 610. The through-air roll 610 rotates relative to a stationary structure of the through-air apparatus. The specific embodiment disclosed in FIGS. 8-9 illustrate a configuration where the stationary structure includes an internal baffle 750. Note that in this embodiment, there may or may not be an inactive zone blocking plate 630, as described above and as shown in FIGS. 6-7.

In the embodiment shown in FIGS. 8-9, the baffle 750 includes at least a first baffle sealing element 732 and a second baffle sealing element 734. In the illustrative embodiment, the first sealing element 732 is positioned at one end of the inactive zone and the second sealing element is positioned at the other end of the inactive zone. One of ordinary skill in the art will recognize that the first and second sealing elements 732, 734 are configured to reduce in-leak of ambient air into the active zone of the through-air apparatus, relative to an otherwise identical baffle structure lacking the sealing elements. As shown in FIG. 8, and also as shown in the detailed view shown in FIG. 9, one or more channels 740 are provided for the delivery of recirculated air, or other air stream, to at least one sealing element 732, 734 thereby further reducing the in-leak of ambient air into the active zone of the through-air apparatus 700. As shown, in one embodiment, the channel 740 is inside of the through-air roll 610. As shown in FIGS. 8-9, at least one channel 740 extends radially outwardly from the first axis 602 towards a circumference of the through-air roll 610. As shown, a first channel 740 extends outwardly towards the first sealing element 732 and a second channel 740 extends outwardly towards the second sealing element 734. In one embodiment, at least a portion of the channel 740 may extend along the first axis 602 (i.e. axis of rotation of the through-air roll 610). It is contemplated that exhaust air, or some other system air from the through-air apparatus, may be circulated through the channel along the axis 602 and then radially out to the sealing elements 732, 734.

As shown in FIGS. 8-9, the sealing elements 732, 734 may include at least one of a perforated plate, channel, nozzle, or slot configured to generate an air curtain to reduce the infiltration of ambient air into the through-air apparatus 700. In this embodiment, the sealing elements 732, 734 are configured to generate an air curtain extending radially outwardly toward the rotating through-air roll 610. These features on the sealing elements 732, 734 are represented in FIGS. 8-9 by the four parallel arrows extending outwardly from the sealing elements 732, 734 toward the rotating through-air roll 610. In other words, the sealing elements 732, 734 may include channel segments 742 (i.e. channel portions) in gaseous communication with the one or more channels 740 for the delivery of recirculated air, or other air stream. As shown in FIGS. 8-9, the channel segments 742 may have a rectangular cross-section and a perforated face 744 substantially parallel to the adjacent carrying surface 612 of the through-air roll 610 (i.e. rotating web-carrying structure). Air is delivered through these perforations 746 to further reduce the in-leak of ambient air into the active zone of the through-air apparatus 700. Perforations 746 is intended to broadly include a perforated plate, channel, nozzle, slot, and/or other configurations known to one of ordinary skill in the art to generate an air curtain at the sealing element 732, 734. It should be appreciated that the perforations 746 may be profiled in the machine direction or the cross-machine direction to accommodate changing pressure or air flow requirements at various points along the sealing area. In other words, the perforations 746 may be oriented differently to achieve desirable effects. Furthermore, it should be appreciated that the disclosure contemplates one or more sealing elements 732, 734 positioned along any side of the perimeter of the baffle 750.

Figure 10:
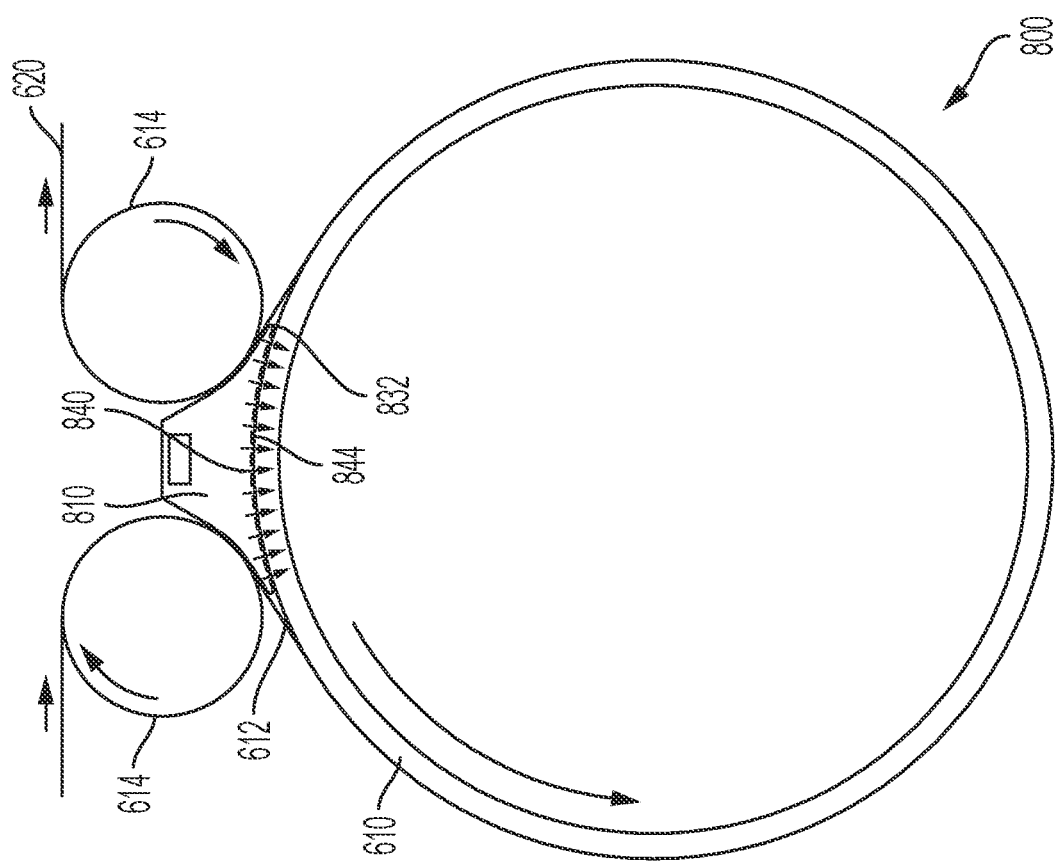
FIG. 10 is a cross-sectional view of a though-air apparatus according to another embodiment which includes a plenum.

Turning now to FIG. 10 which illustrates a cross-sectional view of a though-air apparatus 800 according to another embodiment which includes a plenum 810 external to the through-air roll 610. As discussed above, the through-air roll 610 (i.e. rotating web-carrying structure) is configured to rotate about its central axis. As shown, a web 620 is wrapped around the roll 610 and the apparatus 800 also include rollers 614 which assist in transfer of the web 620 onto and off of the roll 610. In this specific embodiment shown in FIG. 10, the through-air roll 610 rotates relative to a stationary structure of the through-air apparatus 800 which includes plenum 810 positioned to cover the inactive zone of the apparatus 800. For simplicity, additional components of the through-air apparatus 800 inside of the through-air roll 610 are not shown in FIG. 10. As represented by the plurality of arrows, the plenum includes one or more channels 840 for delivering recirculated air, or other air stream to the one or more plenum sealing elements 832. In one embodiment, the sealed plenum 810 has a perforated plate 844 with a surface facing, in spaced apart relation, the exterior of the web carrying structure (i.e. through-air roll 610) occupying the inactive zone of the through-air apparatus 800. The sealed plenum 810 is in gaseous communication with one or more channels (such as channels 640, 740 shown in FIGS. 6-8) for the delivery of recirculated air, or other air streams, whereby the air is delivered through the perforated plate 844 to the inactive zone to further reduce the in-leak of ambient air into the active zone of the through-air apparatus 800. As mentioned above, the term perforated plate 844 is intended to broadly include a perforated plate, channel, nozzle, slot, and/or other configurations known to one of ordinary skill in the art to generate an air curtain at the sealing element 832. It should be appreciated that the perforations may be oriented in different configurations relative to the adjacent rotating through-air roll 610 to provide different air flow conditions along the sealing area.

FIGS. 11-12 illustrate one embodiment of a though-air apparatus 900 which includes a plurality of exhaust duct sealing elements 932, 934. In this embodiment, the through-air roll 610 rotates relative to one or more exhaust ducts 910. An exhaust duct 910 is typically positioned at one end of the apparatus 900 and it is configured such that system air inside of the through-air roll 610 is drawn out of the apparatus 900 and then into the conduit/ducting 170. FIG. 11 illustrates a cross-sectional side view of the through-air apparatus 900 with two exhaust duct sealing elements 932, 934 positioned at one end of the apparatus 900. In one embodiment, the exhaust duct sealing elements 932, 934 may have a circular shape (i.e. donut-shaped). In another embodiment, these exhaust duct sealing elements 932, 934 may have different geometries, and may for example include curved and/or straight portions. As shown, identical exhaust duct sealing element 932, 934 may be positioned at the other end of the apparatus 900. As mentioned above, there may be a space/gap between the rotating through-air roll 610 and the exhaust duct 910. The exhaust duct sealing element 932, 934 is configured to reduce the infiltration of ambient air into the through-air apparatus 900.

For simplicity, additional components of the through-air apparatus 900 inside of the through-air roll 610 are not shown. The exhaust duct sealing elements 932, 934 may be in gaseous communication with one or more channels for the delivery of air (from any of the above-described sources) to the exhaust duct sealing elements 932, 934 to reduce the infiltration of ambient air into the through-air apparatus 900. As represented by the arrows, there are one or more channels for delivering recirculated air, or other air stream to the one or more exhaust duct sealing elements 932, 934. It should be recognized that in this embodiment shown in FIGS. 11-12, where the sealing elements 932, 934 are external to the roll 610, these channels may also be external to the roll 610. This is in contrast to the channels 640, 740 shown in FIGS. 6-8 which are internal to the roll.

It should be appreciated that the above-described perforations may also be provided on the exhaust duct sealing elements 932, 934 to further reduce the in-leak of ambient air into the through-air apparatus 900. As mentioned above, the term perforations is intended to broadly include a perforated plate, channel, nozzle, slot, and/or other configurations known to one of ordinary skill in the art to generate an air curtain at the sealing element 932, 934.

FIG. 13 is a cross-sectional side view of a through-air apparatus 1000 according to yet another embodiment of the present disclosure which includes a plurality of radial exhaust duct sealing elements 932, 934. In this embodiment, the through-air roll 610 rotates relative to one or more exhaust ducts 910. Unlike the embodiment shown in FIG. 11, in this embodiment, the end caps of the through-air roll 610 are closed. As shown, an exhaust duct 910 is typically positioned at one end of the apparatus 1000 and it is configured such that system air passes through the web-carrying structure (as represented by the arrows along the length of the through-air roll 610) and is drawn out of the through-air roll 610 and into the exhaust duct 910 (represented by arrows adjacent the exhaust duct 910) and then into the conduit/ducting 170 (as shown in FIGS. 1-5). FIG. 13 illustrates two exhaust duct sealing elements 932, 934 positioned at one end of the apparatus 1000. In one embodiment, the radial exhaust duct sealing elements 932, 934 may have a circular shape (i.e. donut-shaped), but as discussed above, other shapes and geometries are also contemplated. As mentioned above, there may be a space/gap between the rotating through-air roll 610 and the exhaust duct 910. The radial exhaust duct sealing elements 932, 934 are configured to reduce the infiltration of ambient air into the through-air apparatus 1000.

For simplicity, additional components of the through-air apparatus 1000 inside of the through-air roll 610 are not shown. The radial exhaust duct sealing elements 932, 934 may be in gaseous communication with one or more channels for the delivery of air (from any of the above-described sources) to the radial exhaust duct sealing elements 932, 934 to reduce the infiltration of ambient air into the through-air apparatus 1000. As represented by the arrows inside of the sealing elements 932, 934, there are one or more channels for delivering recirculated air, or other air stream to the one or more radial exhaust duct sealing elements 932, 934. It should be recognized that in this embodiment shown in FIG. 13, where the sealing elements 932, 934 are external to the roll 610, these channels may also be external to the roll 610.

The present disclosure also contemplates embodiments of a through-air apparatus that include a flow-through roll. FIG. 14 is a cross-sectional view of a through-air apparatus 1100 according to one embodiment which includes an outward flow-through arrangement, whereas FIG. 15 is a cross-sectional view of a through-air apparatus 1200 according to another embodiment which includes an inward flow-through arrangement.

The outward flow-through arrangement shown in FIG. 14 includes a though-air apparatus 1100 which includes a through-air roll 610, an exhaust plenum 1150, and a hood 1130 extending around the through-air roll 610 and the angular wrap of the web 620. As discussed above, the through-air roll 610 (i.e. rotating web-carrying structure) is configured to rotate about its central axis. Similar to the embodiment disclosed in FIG. 10, a web 620 is wrapped around the roll 610 and the apparatus 1100 also include rollers 614 which assist in transfer of the web 620 onto and off of the roll 610. In this specific embodiment shown in FIG. 14, the through-air roll 610 rotates relative to another structure of the through-air apparatus 1100 (which includes the stationary exhaust plenum 1150, the rotating rollers 614, and the hood 1130). For simplicity, additional components of the through-air apparatus 1100 inside of the through-air roll 610 are not shown in FIG. 14.

The path of system air is shown with open arrow heads in FIG. 14. As shown, the system air extends down through the plenum 1150 positioned between the two rollers 614 and into the through-air roll 610. Once inside the through-air roll 610, the system air flows outwardly through the web-carrying structure of the through-air roll 610.

As discussed above, the present disclosure is directed to including at least one channel which is configured to direct air to at least one sealing element on the through-air apparatus to reduce the infiltration of ambient air into the through-air apparatus. In this particular embodiment, the through-air apparatus 1100 includes exhaust plenum sealing elements 1132 positioned at the upper portion of the plenum 1150 adjacent the rollers 614. The path of these channels which direct air to at least one sealing element is shown in FIG. 14 by the closed arrow heads. For example, as shown, there may be a channel inside of the exhaust plenum sealing elements 1132 to reduce the infiltration of ambient air into the through-air apparatus 1100. As shown by the arrows, these channels may be angled toward roll 614. In one embodiment, these channels run in the cross-machine direction. As shown in FIG. 14, there may also be channels inside of the exhaust plenum 1150 and there may also be channels inside of the hood 1130 positioned around the periphery of the through-air roll 610.

As represented by the plurality of closed arrow heads, the exhaust plenum 1150 and hood 1130 include one or more channels for delivering recirculated air, or other air stream to the one or more plenum sealing elements 1132, 1134. As discussed above, the exhaust plenum 1150 and hood 1130 are in gaseous communication with one or more channels for the delivery of recirculated air, or other air streams, whereby the air is delivered through the channels to reduce the in-leak of ambient air into the through-air apparatus 1100. It should be recognized that in this embodiment shown in FIG. 14, where the sealing elements 1132, 1134 are external to the roll 610, these channels may also be external to the roll 610.

The inward flow-through arrangement shown in FIG. 15 includes a though-air apparatus 1200 which includes substantially the same labeled components described above with respect to the embodiment shown in FIG. 14. The difference is that the direction of system air flow is opposite. In particular, the path of system air is shown with open arrow heads in FIG. 15. As shown, the system air extends through the through-air roll 610 and upwardly into the exhaust plenum 1150 positioned between the rollers 614. In some respects, the embodiment shown in FIG. 15 is similar to the plenum configuration shown in FIG. 10.

In FIG. 15, as represented by the plurality of closed arrow heads, the exhaust plenum 1150 includes one or more channels for delivering recirculated air, or other air stream to the one or more exhaust plenum sealing elements 1132, 1134. The exhaust plenum 1150 is in gaseous communication with one or more channels for the delivery of recirculated air, or other air streams, whereby the air is delivered through the channels to reduce the in-leak of ambient air into the through-air apparatus 1200. It should be recognized that in this embodiment shown in FIG. 15, where the sealing elements 1132, 1134 are external to the roll 610, these channels may also be external to the roll 610. This is in contrast to the channels 640, 740 shown in FIGS. 6-8 which are internal to the roll.

Turning now to FIG. 16, which illustrates one embodiment of a through-air apparatus which includes a web-carrying structure that is configured for translational movement. In particular, FIG. 16 is a cross-sectional view of one embodiment of a through-air apparatus 1300 which includes a flatbed configuration, which may be configured as either a through-air dryer (TAD) or a through-air bonder (TAB). In summary, the principle is the same as the above described embodiment, the difference is that unlike FIGS. 6-15 which are directed to a web-carrying structure which is configured as a through-air roll configured to rotate, the embodiment disclosed in FIG. 16 is directed to a web-carrying structure which is a flatbed belt 1310. In one embodiment, the flatbed belt 1310 is a mesh/screen-like material that may be made from metal or synthetic strands. In the embodiment illustrated in FIG. 16, the flatbed belt 1310 is configured for translational movement along a horizontal plane. In another embodiment, it is contemplated that the flatbed belt 1310 is configured for translational movement along an inclined plane. A web is placed on the flatbed belt 1310 and the flatbed belt 1310 is moved similar to a conveyor belt. As shown in FIG. 16, adjacent components of the through-air apparatus 1300, such as the upper plenum 1330 include at least one sealing element 1332 which is configured to reduce the infiltration of ambient air into the through-air apparatus 1300. Furthermore, as represented by the arrows in FIG. 16, at least one channel is provided which is configured to direct air to the at least one sealing element 1332 to reduce infiltration of ambient air into the through-air apparatus 1300.

It should also be recognized that although many of the above-described through-air apparatus components with sealing elements may be discussed as being stationary relative to the moving web-carrying structure, the above-described concepts are also applicable to through-air apparatus components with sealing components that may be movable (configured for rotational and/or translational movement), as the disclosure is not limited in this respect. There may be in-leak of ambient air into the through-air apparatus with two movable components, thus the disclosure is directed to both stationary and movable components with sealing elements.

Furthermore, as discussed above, the through-air apparatus components with sealing elements may be positioned within the web-carrying structure (such as within through-air roll 610, with the blocking plate sealing elements 632, 634 and baffle sealing elements 732, 734 shown in FIGS. 6-9), and/or the through-air apparatus components with sealing elements may be positioned external to the web-carrying structure (such as outside of the through-air roll 610, with the plenum sealing elements 832 and exhaust duct sealing elements 932, 934 shown in FIGS. 10-12).

Furthermore, one of ordinary skill in the art would recognize that in one embodiment, the above-described through-air apparatus may be used on a through-air dryer, and in another embodiment, the above-described through-air apparatus may be used on a through-air bonder, as the disclosure is not so limited.

Aspects of the present disclosure are directed to methods of operating a through-air apparatus. The method includes placing a web on a portion of a web-carrying structure and moving the web-carrying structure such that the web moves with the web-carrying structure. The method also includes providing a first component having at least one sealing element adjacent to the web-carrying structure, where the at least one sealing element on the first component is configured to reduce the infiltration of ambient air into the through-air apparatus, and directing air to the at least one sealing element to reduce the infiltration of ambient air into the through-air apparatus. In one embodiment, the act of directing air includes directing heated air to the at least one sealing element to reduce the infiltration of ambient air into the through-air apparatus. In another embodiment, a non-heated air stream may be directed to the at least one sealing element.

In one embodiment, the web-carrying structure is a through-air roll, and the method includes wrapping the web around an angular portion of a through-air roll, creating active and inactive air flow zones of the through-air apparatus, and rotating the through-air roll about a first axis such that the web rotates with the through-air roll. In another embodiment, the web-carrying structure is a flatbed belt configured for translational movement along either a horizontal or an inclined plane.

In one embodiment, the first component includes an exhaust duct and an exhaust duct sealing element and the air is directed to the exhaust duct sealing element to reduce the infiltration of ambient air into the through-air apparatus.

In another embodiment, the first component includes an internal baffle and an inactive zone blocking plate, and air is directed to the blocking plate sealing element to reduce the infiltration of ambient air into the through-air apparatus.

In yet another embodiment, the first component includes a plenum, and air is directed through the plenum to at least one sealing element to reduce the infiltration of ambient air into the through-air apparatus.

It should be understood that the present disclosure contemplates that there could also be second and third components of the through-air apparatus having additional sealing elements where air is directed to these additional sealing elements to reduce the infiltration of ambient air into the through-air apparatus.

It should also be recognized that, in one embodiment, the air directed to the one or more sealing elements may be recirculated system air from another portion of the through-air apparatus. In another embodiment, the air directed to the one or more sealing elements may be sources from at least one of a Yankee hot air system exhaust air stream, a vacuum pump exhaust air stream, a turbine exhaust air stream, or any other heated air stream. And in yet another embodiment, the air directed to the one or more sealing elements may be provided from a non-heated air source.

Furthermore, it should be recognized that the above-described concepts can be used to control and regulate humidity levels of the system air within the through-air apparatus.

Although several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto; the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

All references, patents and patent applications and publications that are cited or referred to in this application are incorporated in their entirety herein by reference.

What is claimed is:

1. A through-air apparatus for drying or bonding paper, tissue, or nonwoven webs, the apparatus comprising:
   a web-carrying structure configured to move;
   a first component having at least one sealing element adjacent the web-carrying structure, wherein the at least one sealing element is configured to reduce the infiltration of ambient air into the through-air apparatus; and
   at least one channel configured to direct air to the at least one sealing element to reduce the infiltration of ambient air into the through-air apparatus, wherein the at least one channel is positioned within the web-carrying structure and is configured to direct air out from the web-carrying structure.

2. The apparatus of claim 1, wherein the first component is configured to be stationary, and the web-carrying structure is movable relative to the stationary first component.

3. The apparatus of claim 1, wherein the web-carrying structure is a through-air roll configured for rotational movement about a first axis, and wherein the at least one channel is configured to direct air radially outwardly from the through-air roll.

4. The apparatus of claim 3, wherein the first component and the at least one sealing element are positioned within the through-air roll.

5. The apparatus of claim 1, wherein the first component includes one or more exhaust ducts, and the at least one sealing element includes at least one exhaust duct sealing element, and
wherein the at least one channel is configured to direct air to the at least one exhaust duct sealing element to reduce the infiltration of ambient air into the through-air apparatus.

6. The apparatus of claim 3, wherein the through-air apparatus includes an active zone and an inactive zone, wherein the first component includes an internal baffle and an inactive zone blocking plate which is positioned in the inactive zone of the through-air apparatus, and the at least one sealing element includes at least one blocking plate sealing element; and
wherein the at least one channel is configured to direct air to the at least one blocking plate sealing element to reduce the infiltration of ambient air through the inactive zone and into the through-air apparatus.

7. The apparatus of claim 6, further comprising:
a second component having at least one sealing element adjacent the through-air roll, wherein the at least one second component sealing element is configured to reduce the infiltration of ambient air into the through-air apparatus; and
at least one channel configured to direct air to the at least one second component sealing element to reduce the infiltration of ambient air into the through-air apparatus;
wherein the second component includes one or more exhaust ducts, and the at least one second component sealing element includes at least one exhaust duct sealing element, and
wherein the at least one channel is configured to direct air to the at least one exhaust duct sealing element to reduce the infiltration of ambient air into the through-air apparatus.

8. The apparatus of claim 1, wherein the at least one channel is configured to recirculate system air from another portion of the through-air apparatus to the at least one sealing element.

9. The apparatus of claim 1, wherein the at least one channel is configured to flow heated air from at least one of a Yankee hot air system exhaust air stream, a vacuum pump exhaust air stream, a turbine exhaust air stream, or any other heated air stream, to the at least one sealing element.

10. The apparatus of claim 3, wherein the through-air apparatus includes an active zone and an inactive zone, wherein the first component includes a plenum which is configured to cover either the active zone or the inactive zone of the through-air apparatus; and
wherein the at least one channel is configured to direct air through the plenum and to the at least one sealing element to reduce the infiltration of ambient air into the through-air apparatus.

11. The apparatus of claim 1, wherein the first component includes at least one of a perforated plate, nozzles, channels, and slots to distribute air to the at least one sealing element.

12. The apparatus of claim 1, wherein the air flow through the channel is controlled through the adjustment of fan speeds, damper positions, or variable flow restrictions within the channel or the sealing element themselves, or other means to allow for even distribution of the air to the at least one sealing element.

13. The apparatus of claim 3, wherein at least a portion of the channel extends within the through-air roll and along the first axis.

14. The apparatus of claim 1, further comprising a fan configured to pump air to the at least one sealing element.

15. The apparatus of claim 1, wherein the web-carrying structure is a flatbed belt configured for translational movement along either a horizontal or an inclined plane.

16. A method of operating a through-air apparatus for drying or bonding paper, tissue, or nonwoven webs, the method comprising:
placing a web on a portion of a web-carrying structure;
moving the web-carrying structure such that the web moves with the web-carrying structure;
directing process air through the web-carrying structure, wherein the process air exits into a through-air apparatus exhaust duct;
providing a first component having at least one sealing element adjacent to the web-carrying structure, wherein the at least one sealing element on the first component is configured to reduce the infiltration of ambient air into the through-air apparatus; and
directing heated air to the at least one sealing element to reduce the infiltration of ambient air into the through-air apparatus, wherein the heated air directed to the sealing element is sourced from a location other than the through-air apparatus exhaust duct.

17. The method of claim 16, wherein the heated air is sourced from at least one of pre-heated ambient air, turbine exhaust gas, Yankee hot air system exhaust air, vacuum pump exhaust air, or other heated air streams in a paper machine or mill environment, or any other hot air source, and wherein the heated air is not only sourced from the through-air apparatus exhaust duct.

18. A through-air apparatus for drying or bonding paper, tissue, or nonwoven webs, the apparatus comprising:
a) a rotating web-carrying structure comprising a carrying surface having a plurality of openings to permit the passage of air, and a web wrap angle defining angular active and inactive zones of the web-carrying structure and creating active and inactive air flow zones of the through-air apparatus;
b) a stationary structure which the rotating web-carrying structure rotates relative to, wherein the stationary structure is positioned to cover the inactive zone of the through-air apparatus, the stationary structure comprising one or more sealing elements configured to reduce in-leak of ambient air into the active zone of the through-air apparatus relative to an otherwise identical structure lacking the one or more sealing elements; and
c) one or more channels in the stationary structure, for the delivery of recirculated air, or other heated air stream through the stationary structure, to one or more of the sealing elements thereby further reducing the in-leak of ambient air into the active zone of the through-air apparatus, and wherein the one or more channels in the stationary structure cover the inactive zone to direct air through a portion of the web-carrying structure that does not include a web.

19. The apparatus of claim 18, wherein the heated air stream is sourced from at least one of pre-heated ambient air, turbine exhaust gas, Yankee hot air system exhaust air, vacuum pump exhaust air, or other heated air streams in a paper machine or mill environment, or any other hot air source, and wherein the heated air stream is not only sourced from a through-air apparatus exhaust duct.

20. The method of claim 16, wherein the amount of heated air flowing to the at least one sealing element is controlled through the adjustment of fan speeds, damper positions, and/or variable flow restrictions.

\* \* \* \* \*